United States Patent [19]
Laone et al.

[11] Patent Number: 5,392,734
[45] Date of Patent: Feb. 28, 1995

[54] CHEW TOY FOR CATS AND DOGS

[76] Inventors: Ronald P. Laone; Beate W. Laone, both of 17 Wilson St., Union City, Conn. 06770

[21] Appl. No.: 134,628

[22] Filed: Oct. 12, 1993

[51] Int. Cl.$^6$ ............................................. A01K 29/00
[52] U.S. Cl. ................................. 119/710; D30/160
[58] Field of Search ................ 119/26, 707, 709, 710; 446/490; D30/160

[56] References Cited
U.S. PATENT DOCUMENTS

| | | | |
|---|---|---|---|
| 4,321,888 | 3/1982 | Topliffe | 119/709 |
| 4,884,807 | 12/1989 | Welch | 119/707 X |
| 4,924,811 | 5/1990 | Axelrod | 119/170 |
| 5,099,796 | 3/1992 | Morgan | 119/26 |

*Primary Examiner*—Robert P. Swiatek

[57] ABSTRACT

A chew toy for cats and dogs includes a rope knot node and a first flexible rope arm, a second flexible rope arm, and a third flexible rope arm which depend from the rope knot node. The respective flexible rope arms include respective end knots and respective middle portions. The respective flexible rope arms include respective portions projecting from the rope knot node. A first orientation angle is located between a first portion and a second portion and is approximately sixty degrees. A second orientation angle is located between the second portion and a third portion and is approximately sixty degrees. A third orientation angle is located between the first portion and the third portion and is approximately one hundred twenty degrees. A flavor distribution assembly may be supported by the rope knot node and the respective rope arms. A light source assembly may be attached to the receptacle assembly for providing light to the chew toy. The receptacle assembly is shaped in the form of a hemisphere which includes a planar, circular side. The bottom portion of the receptacle assembly is transparent, and the first distributor tube, the second distributor tube, and the third distributor tube are transparent. The light source assembly includes a hemispherically shaped housing member which is connected to the hemispherically shaped receptacle assembly. The hemispherically shaped housing member is also transparent.

14 Claims, 4 Drawing Sheets

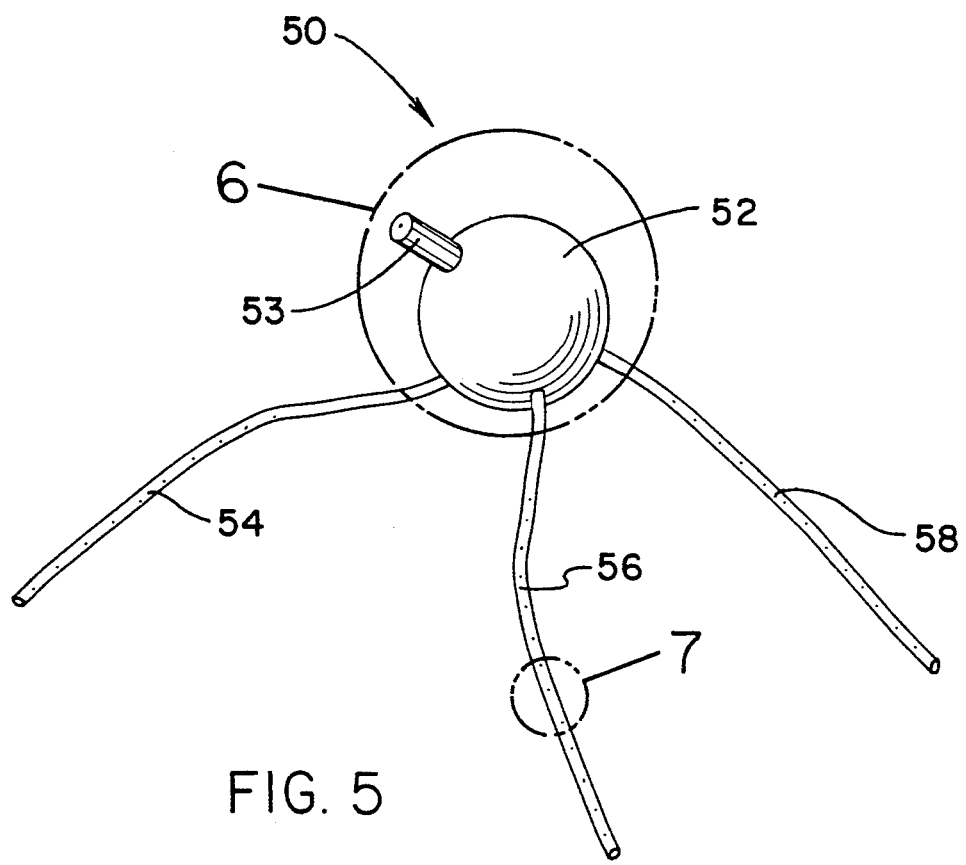
FIG. 5
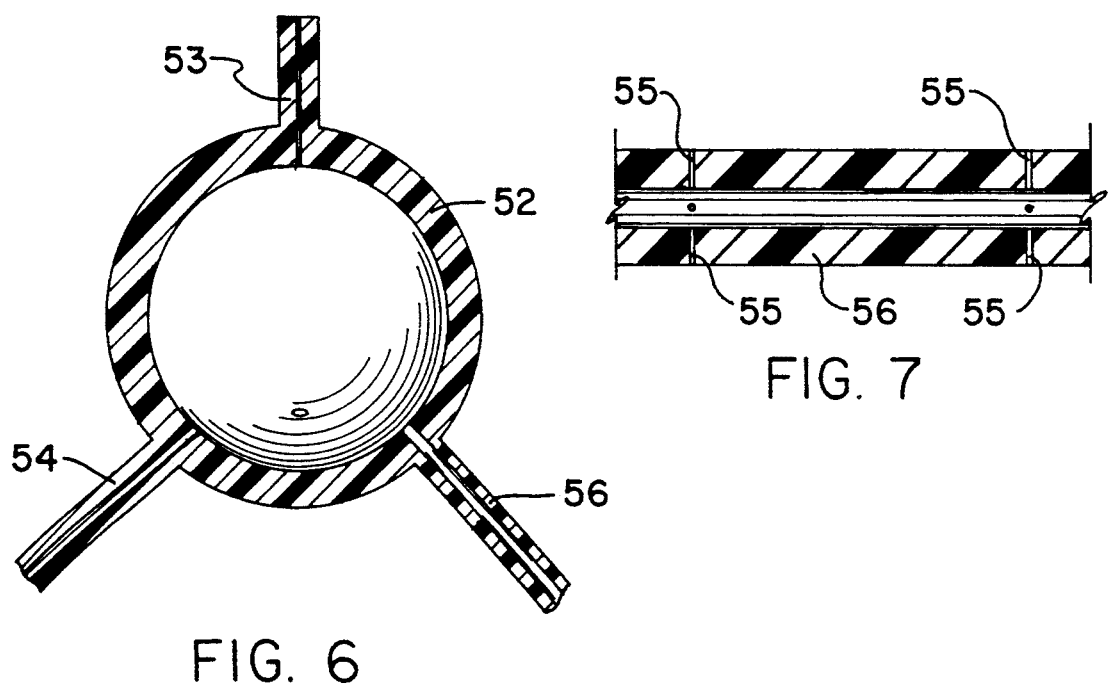
FIG. 6
FIG. 7

CHEW TOY FOR CATS AND DOGS

BACKGROUND OF THE INVENTION

1. Field of the Invention

The present invention relates generally to toys for pets, and, more particularly, to chew toys for cats and dogs.

2. Description of the Prior Art

Many people the word over have one or more dogs or cats as pets. Often a pet owner will play with their pet in a number of ways. Moreover, a pet may find amusement in a :number of ways without playing with the owner. A number of toys have been developed which can be used in play for a dog or cat, either with the person playing with the pet or the pet playing by itself. The following U.S. Pat. Nos. are representative of some of those pet toys: 3,830,202; 4,133,296; 5,033,410; 5,092,272; and 5,174,243.

More specifically, U.S. Pat. No. 3,830,202 discloses a two-ended pet toy that includes a flexible rope that is partially jacketed by a solid, bowling-pin shaped, outer structure. Often a pet may bite down on one end of the rope in its mouth and shake its head holding the end of the rope in its mouth. As a result, the solid, outer structure may fly around and slap the pet in the head causing pain and discomfort and perhaps injury to the pet. In this respect, it would be desirable if a pet toy were provided which did not include a solid object that jackets part of a flexible rope and that can slide along the flexible rope.

U.S. Pat. No. 4,133,296 discloses a two-ended pet toy that has weights located at opposite ends of a flexible tubular member. U.S. Pat. No. 5,033,410 discloses a two-ended pet toy that is rope-like and has bristle structure. The toy may be impregnated with flavor material. U.S. Pat. No. 5,174,243 a two-ended pet toy that has bone-like covers at either end and a rope-like structure connecting the two ends. In all of the above-mentioned two-ended toys for pets, the amount and type of play activity that can be employed by either the person with the pet or the pet by itself is relatively limited. In this respect, it would be desirable if a pet toy were provided which were not limited by the play activities provided by a two-ended pet toy.

U.S. Pat. No. 5,092,272 discloses a pet toy based on rope that has two free ends and a closed loop for a third end. The closed loop has its own handle which jackets a rope portion. A disadvantage of the jacket for the rope portion is that the jacket may fall apart during rough play and cause a hazard to the eyes and the throat of the pet. In this respect, it would be desirable if a rope-base pet toy were provided which did not include a jacket for a portion of the rope. Another disadvantage of the toy in this patent is the presence of a dosed loop. A pet may get its head caught in the closed loop and may possibly choke therefrom. In this respect, it would be desirable if a pet toy were provided which did not include a closed loop. Still another disadvantage is present in the toy in this patent. The two free ends project in one direction from the joined region between the two free ends, and the looped end projects in an opposite direction. Because of the differences in directional orientation of the parts of the toy, the pet may favor one end over another and cause premature wear at a favored end. In this respect, it would be desirable if a pet toy were provided which had three equivalent free ends so that one free end would not be favored by a pet causing premature wear of the favored end.

As mentioned above, U.S. Pat. No. 5,033,410 discloses a rope-like toy that is impregnated with flavor material. The presence of flavor material may provide benefits in inducing the pet to chew, which may be a healthy activity. However, a limited amount of flavor material may be carried by the rope-like material. Once the limited amount of flavor material is used up, the toy no longer bears the flavor. In this respect, it would be desirable if a pet toy were provided which permitted periodic addition of flavor material without depending upon only an initial amount of impregnated flavoring material.

Still other features would be desirable in a chew toy for cats and dogs. For example, pet are often fascinated by lights, especially moving lights. In this respect, it would be desirable if a pet toy were provided which has lights combined therewith and permitted the pet, in playing with the toy, to move the light around.

Thus, while the foregoing body of prior art indicates it to be well known to use toys for pets, the prior art described above does not teach or suggest a chew toy for cats and dogs which has the following combination of desirable features: (1) does not include a solid object that jackets part of a flexible rope and that slides along the flexible rope; (2) is :not limited by the play activities provided by a two-ended pet toy; (3) does not include a jacket for a portion of the rope; (4) does not include a closed loop; (5) has three equivalent free ends so that one free end would not be favored by a pet causing premature wear of the favored end; (6) permits periodic addition of flavor material without depending upon only an initial amount of impregnated flavoring material; and (7) has lights combined therewith and permits the pet, in playing with the toy, to move the light around. The foregoing desired characteristics are provided by the unique chew toy for cats and dogs of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved chew toy for cats and dogs which includes a rope knot node and a first flexible rope arm, a second flexible rope arm, and a third flexible rope arm which depend from the rope knot node.

The first flexible rope arm includes a first end knot. The second flexible rope arm includes a second end knot. The third flexible rope arm includes a third end knot.

The first flexible rope arm includes a braided first middle portion. The second flexible rope arm includes a braided second middle portion. The third flexible rope arm includes a braided third middle portion.

The first flexible rope arm includes a first portion projecting from the rope knot node. The second flexible rope arm includes a second portion projecting from the rope knot node. The third flexible rope arm includes a third portion projecting from the rope knot node.

A first orientation angle is located between the first portion and the second portion and is approximately sixty degrees. A second orientation angle is located between the second :portion and the third portion and is approximately sixty degrees. A third orientation angle is located between the first portion and the third portion and is approximately one hundred twenty degrees.

A flavor distribution assembly may be supported by the rope knot node, the first flexible rope arm, the second flexible rope arm, and the third flexible rope arm. The flavor distribution assembly includes a receptacle assembly supported by and housed by the rope knot node. A first distributor tube is connected to the receptacle assembly and is supported by and housed by the first flexible rope arm. A second distributor tube is connected to the receptacle assembly and is supported by and housed by the second flexible rope arm. A third distributor tube is connected to the receptacle assembly and is supported by and housed by the third flexible rope arm.

The receptacle assembly includes a filler tube adapted to receive a hypodermic needle connected to a syringe. The first distributor tube, the second distributor tube, and the third distributor tube, respectively include dispensing apertures through which flavor composition seeps from the respective distributor tubes from the receptacle assembly.

A light source assembly may be attached to the receptacle assembly for providing light to the chew toy. The receptacle assembly is shaped in the form of a hemisphere which includes a planar, circular side. The bottom portion of the receptacle assembly is transparent, and the first distributor tube, the second distributor tube, and the third distributor tube are transparent.

The light source assembly includes a hemispherically shaped housing member which is connected to the hemispherically shaped receptacle assembly. A battery power source is housed within the hemispherically shaped housing member. A lamp is connected to the battery power source and is powered by energy from the battery power source. A switch assembly is supported by the hemispherically shaped housing member and is in circuit with the lamp and the battery power source, for controlling illumination of the lamp. The hemispherically shaped housing member is also transparent.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least five preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved chew toy for cats and dogs which has all of the advantages of the prior art and none of the disadvantages.

It is another Object of the present invention to provide a new and improved chew toy for cats and dogs which may be easily and efficiently manufactured and marketed.

It is a further object of the present invention to provide a new and improved chew toy for cats and dogs which is of durable and reliable construction.

An even further object of the present invention is to provide a new and improved chew toy for cats and dogs which is susceptible of a low cost of manufacture with regard to both materials and labor, and which accordingly is then susceptible of low prices of sale to the consuming public, thereby making such chew toy for cats and dogs available to the buying public.

Still yet a further object of the present invention is to provide a new and improved chew toy for cats and dogs which does not include a solid object that jackets part of a flexible rope and that slides along the flexible rope.

Still another object of the present invention is to provide a new and improved chew toy for cats and dogs that is not limited by the play activities provided by a two-ended pet toy.

Yet another object of the present invention is to provide a new and improved chew toy for cats and dogs which does not include a jacket for a portion of the rope.

Even another object of the present invention is to provide a new and improved chew toy for cats and dogs that does not include a closed loop.

Still a further object of the present invention is to provide a new and improved chew toy for cats and dogs which has three equivalent free ends so that one free end would not be favored by a pet causing premature wear of the favored end.

Yet another object of the present invention is to provide a new and improved chew toy for cats and dogs that permits periodic addition of flavor material without depending upon only an initial amount of impregnated flavoring material.

Still another object of the present invention is to provide a new and improved chew toy for cats and dogs which has lights combined therewith and permits the pet, in playing with the toy, to move the light around.

These together with still other objects of the invention, along with the various features of novelty which characterize the invention, are pointed out with particularity in the claims annexed to-and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 5 is a perspective of a flavor distribution assembly used in the embodiments shown in FIGS. 3 and 4.

FIG. 6 is an enlarged view of the circled region 6 in FIG. 5.

FIG. 7 is an enlarged view of the circled region 7 in FIG. 5.

DESCRIPTION OF THE PREFERRED EMBODIMENT

With reference to the drawings, a new and improved chew toy for cats and dogs embodying the principles and concepts of the present invention will be described.

Figure 1:
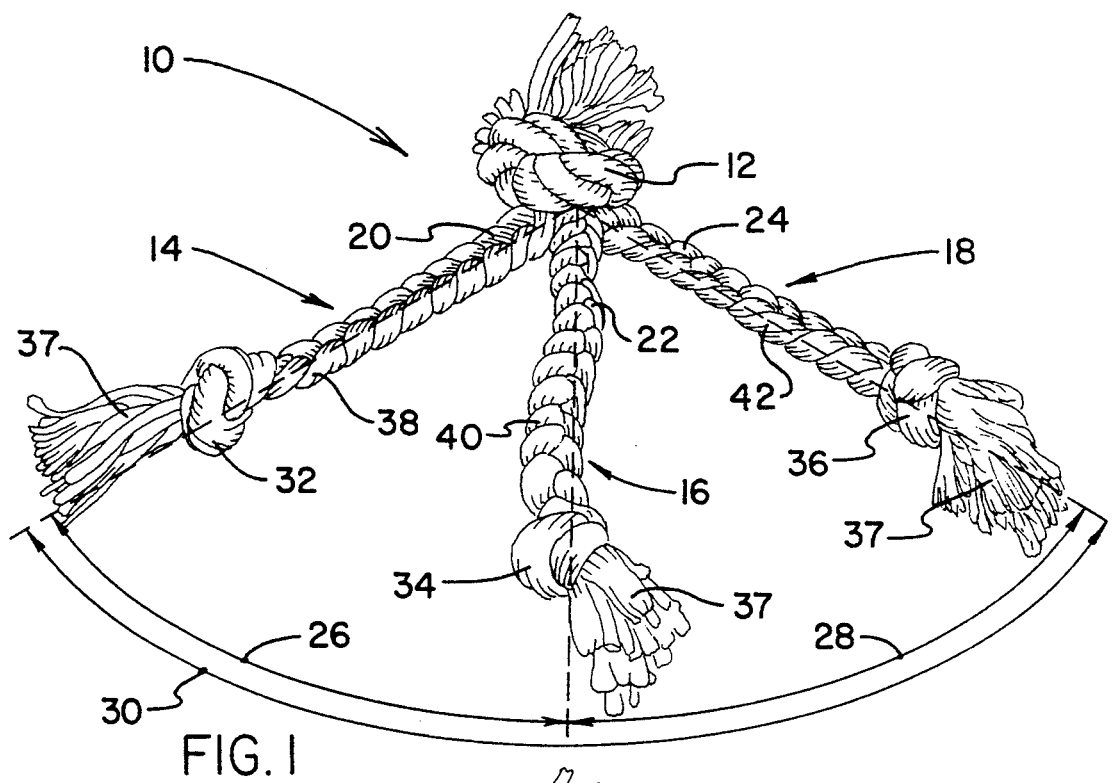
FIG. 1 is a perspective view showing a first preferred embodiment of the chew toy for cats and dogs of the invention.

Turning initially to FIG. 1, there is shown a first exemplary embodiment of the chew toy for cats and dogs of the invention generally designated by reference numeral 10. In its preferred form, the chew toy for cats and dogs 10 includes a rope knot node 12 and a first :flexible rope arm 14, a second flexible rope arm 16, and a third flexible rope arm 18 which depend from the rope knot node 12. The first flexible rope arm 14 includes a first portion 20 projecting from the rope knot node 12. The second flexible rope arm 16 includes a second portion 22 projecting from the rope knot node 12. The third flexible rope arm 18 includes a third portion 24 projecting from the rope knot node 12.

The first flexible rope arm 14 includes a first end knot 32. The second flexible rope arm 16 includes a second end knot 34. The third flexible rope arm 18 includes a third end knot 36.

The first flexible rope arm 14 includes a braided first middle portion 38. The second flexible rope arm 16 includes a braided second middle portion 40. The third flexible rope arm 18 includes a braided third middle portion 42.

A first orientation angle 26 is located between the first portion 20 and the second portion 22 and is approximately sixty degrees. A second orientation angle 28 is located between the second portion 22 and the third portion 24 and is approximately sixty degrees. A third orientation angle 30 is located between the first portion 20 and the third portion 24 and is approximately one hundred twenty degrees. On account of the respective orientation angles, all of the first flexible rope arm 14, the second flexible rope arm 16, and the third flexible rope arm 18 are oriented in the same direction with respect to the rope knot node 12. That is, none of the flexible rope arms extend in opposite directions from one another with respect to the rope knot node 12.

Figure 2:
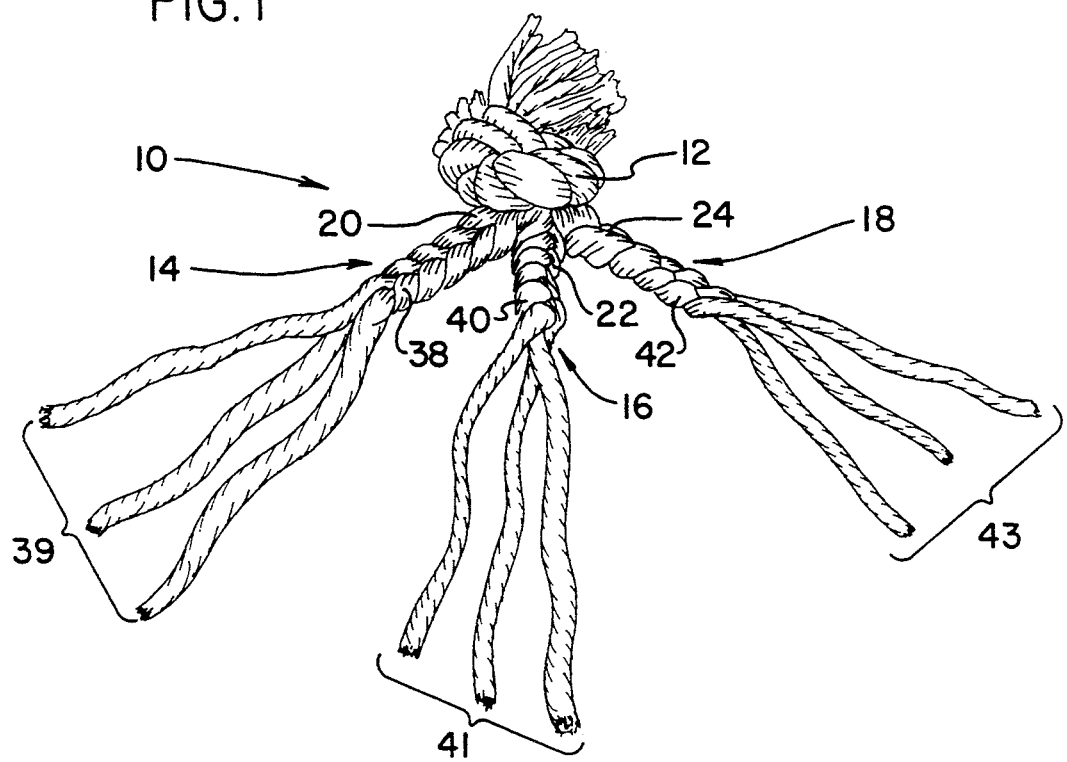
FIG. 2 is a perspective view showing a second embodiment of the chew toy for cats and dogs of the invention.

In the first embodiment of the chew toy for cats and dogs 10 of the invention shown in FIG. 1, respective braided first middle portion 38, braided second middle portion 40, and braided third middle portion 42 are located between the rope knot node 12 and respective first end knot 32, second end knot 34, and third end knot 36. Unknotted filaments 37 extend outward from the respective end knots 32, 34, and 36. In contrast, in the second embodiment of the invention shown in FIG. 2, respective unbraided rope portions 39, 41, and 43 extend outward from the respective braided first middle portion 38, braided second middle portion 40, and braided third middle portion 42.

In use, a person can grasp the first flexible rope arm 14, and the pet can bite the third flexible rope arm 18. In this case, the second flexible rope arm 16 is free to flail about. Alternatively, the person can grasp the second flexible rope arm 16, and the pet can bite either the first flexible rope arm 14 or the third flexible rope arm 18. If the pet bites the first flexible rope arm 14, the third flexible rope arm 18 is free to flail about. If the pet bites the third flexible rope arm 18, then the first flexible rope arm 14 is free to flail about. Still alternatively, the person (or the pet) can retain the rope knot node 12 and the pet (or the person) can retain one of the rope arms. In such as case, two rope arms are free to flail about.

Figure 3:
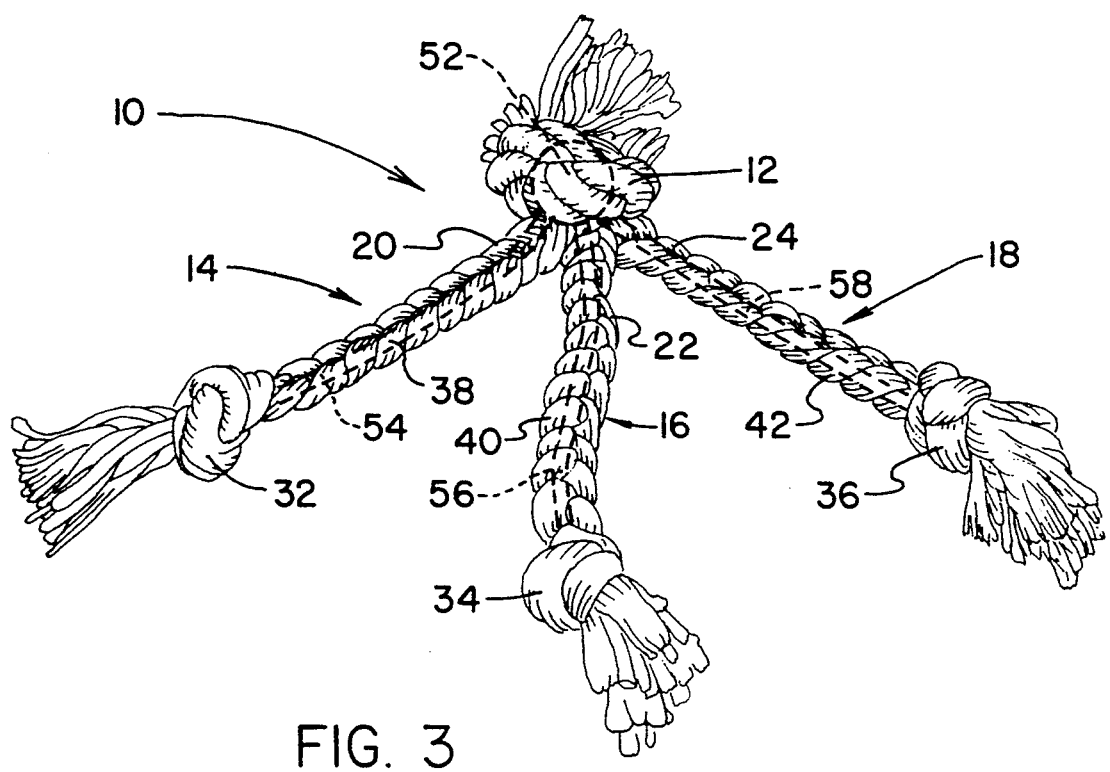
FIG. 3 is a perspective view showing a third embodiment of the chew toy for cats and dogs of the invention wherein a flavor distribution assembly is employed.
Figure 4:
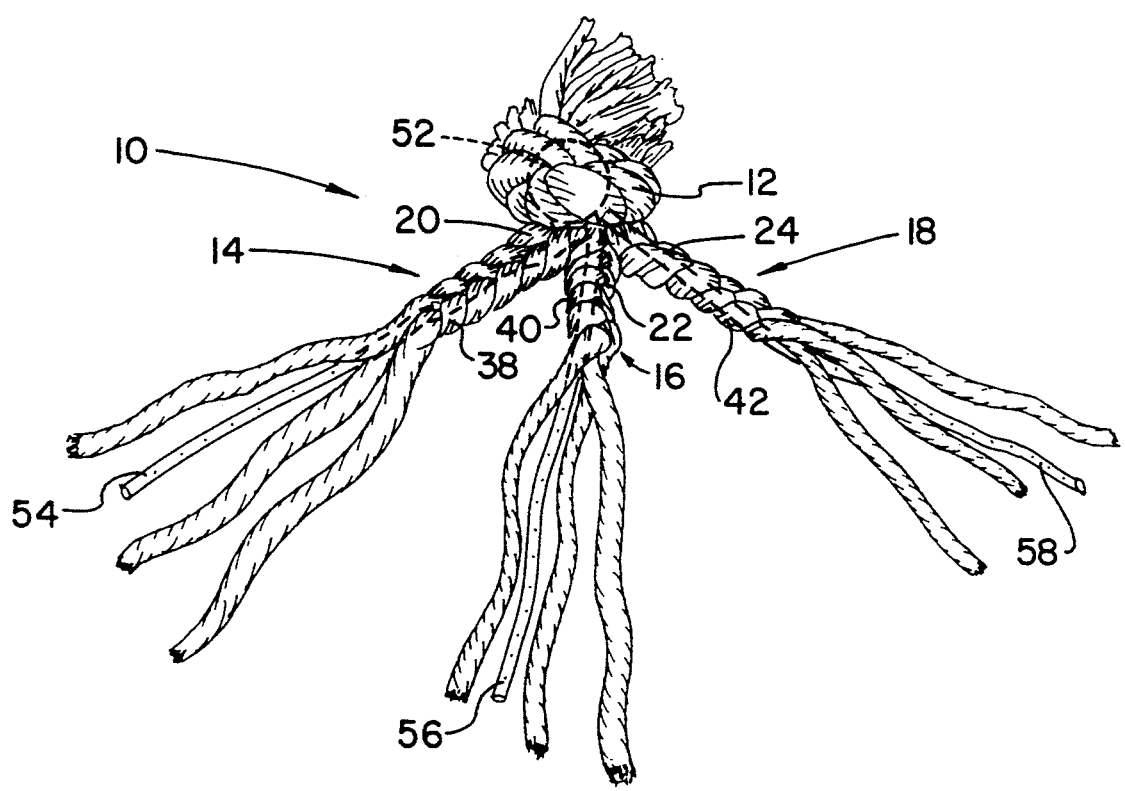
FIG. 4 is a perspective view showing a fourth embodiment of the chew toy for cats and dogs of the invention wherein a flavor distribution assembly is employed.

Turning to FIG. 3 and 4, respective third and fourth embodiments of the invention are shown. Reference numerals are shown that correspond to like reference numerals that designate like elements shown in the other figures. In addition, a flavor distribution assembly 50 is supported by the rope knot node 12, the first flexible rope arm 14, the second flexible rope arm 16, and the third flexible rope arm 18.

As shown in FIGS. 5, 6, and 7, the flavor distribution assembly 50 includes a receptacle assembly 52 supported by and housed by the rope knot node 12. A first distributor tube 54 is connected to the receptacle assembly 52 and is supported by and housed by the first flexible rope arm 14. A second distributor tube 56 is connected to the receptacle assembly 52 and is supported by and housed by the second flexible rope arm 16. A third distributor tube 58 is connected to the receptacle assembly 52 and is supported by and housed by the third flexible rope arm 18. The receptacle assembly 52 includes a filler tube 53 adapted to receive a hypodermic needle (not shown) connected to a syringe for filling the receptacle assembly 52 with liquid flavor composition. The first distributor tube 54, the second distributor tube 56, and the third distributor tube 58, respectively, include dispensing apertures 55 through which flavor composition seeps from the respective distributor tubes from the receptacle assembly 52.

Figure 8:
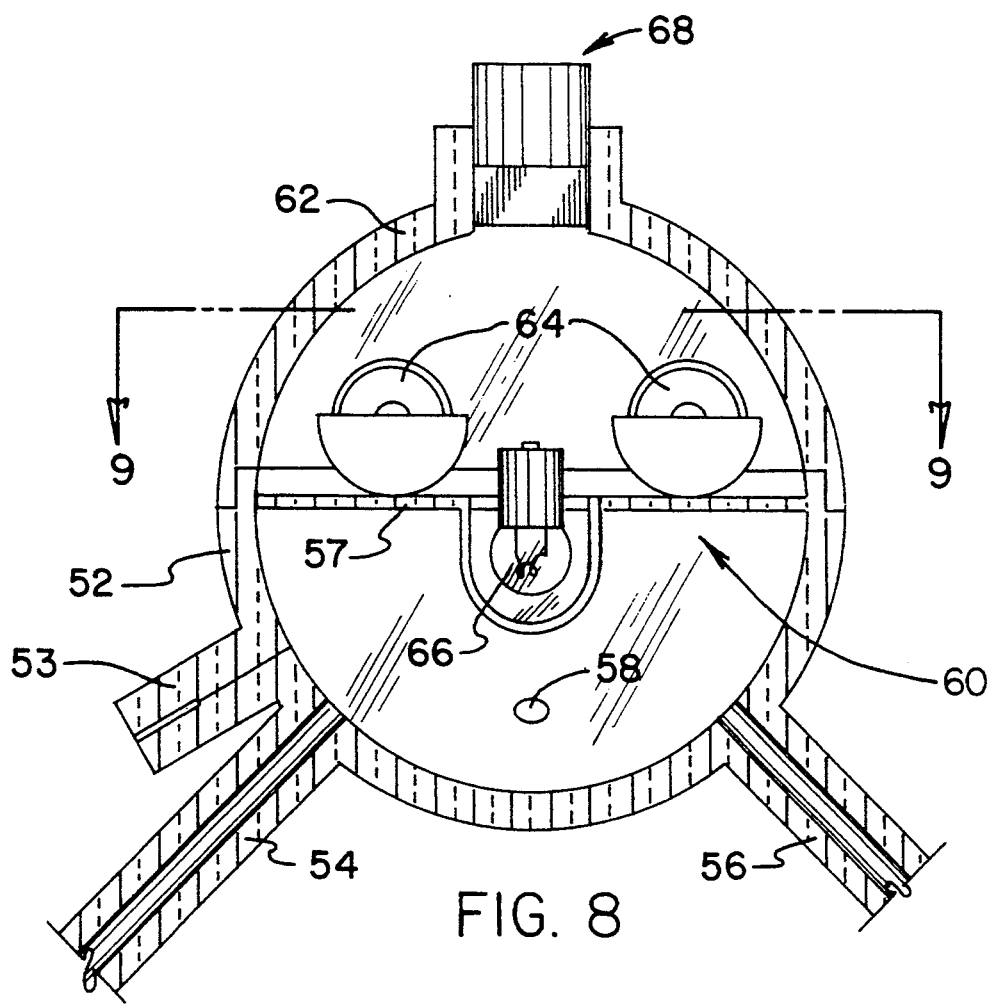
FIG. 8 shows a portion of a fifth embodiment of the invention which includes a light source within.
Figure 9:
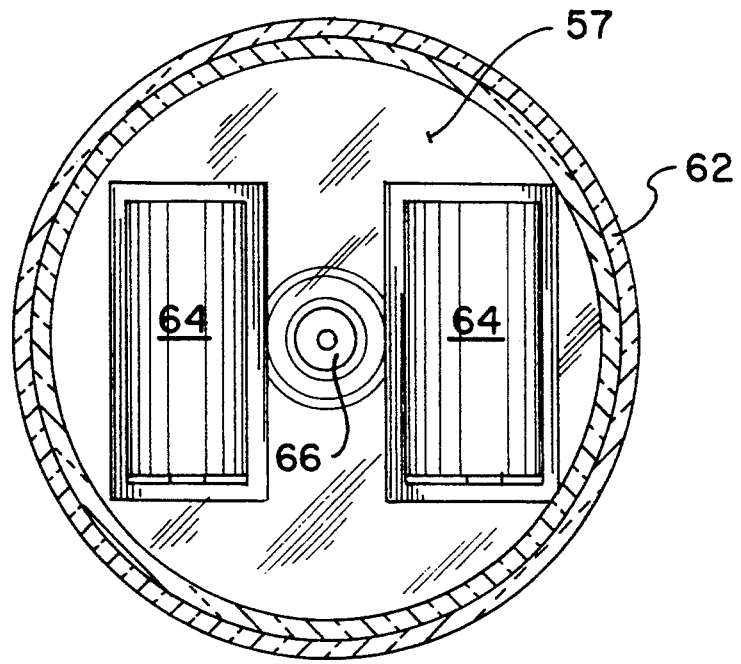
FIG. 9 is a cross-sectional view of the embodiment of the invention shown in FIG. 8 taken along the line 9—9 thereof.

Turning to FIGS. 8 and 9, a fifth embodiment of the invention is shown. Reference numerals are shown that correspond to like reference numerals that designate like elements shown in the other figures. In addition, a light source assembly 60 is attached to the receptacle assembly 52 for providing light to the chew toy. The receptacle assembly 52 is shaped in the form of a hemisphere which includes a planar, circular top side 57. The top portion 57 of the receptacle assembly 52 is transparent, and the first distributor tube 54, the second distributor tube 56, and the third distributor tube 58 are also transparent. In this way, light from the light source assembly 60 passes through the transparent top portion 57 of the receptacle assembly 52, through the flavor composition in the receptacle assembly 52, down the respective first distributor tube 54, second distributor tube 56, and third distributor tube 58, and out the dispensing apertures 55. In addition, some light can also pass through the walls of the first distributor tube 54, the second distributor tube 56, and the third distributor tube 58 so that the walls appear luminous.

The light source assembly 60 includes a hemispherically shaped housing member 62 which is connected to the hemispherically shaped receptacle assembly 52. A battery power source 64 is housed within the hemispherically shaped housing member 62. A lamp 66 is connected to the battery power source 64 and is powered by energy from the battery power source 64. A switch assembly 68 is supported by the hemispherically shaped housing member 62 and is in circuit with the lamp 66 and the battery power source 64, for controlling illumination of the lamp 66. The hemispherically shaped housing member 62 is also transparent.

The components of the chew toy for cats and dogs of the invention can be made from inexpensive and durable rope and plastic materials.

As to the manner of usage and operation of the instant invention, the same is apparent from the :above disclosure, and accordingly, no further discussion relative to the manner of usage and operation need be provided.

It is apparent from the above that the present invention accomplishes all of the objects set forth by providing a new and improved chew toy for cats and dogs that is low in cost, relatively simple in design and operation, and which does not include a solid object that jackets part of a flexible rope and that slides along the flexible rope. With the invention, a chew toy for dogs is provided which is not limited by the play activities provided by a two-ended pet toy. With the invention, a chew toy for dogs is provided which does not include a jacket for a portion of the rope. With the invention, a chew toy for dogs is provided which does not include a closed loop.. With the invention, a chew toy for dogs is provided which has three equivalent :free ends so that one free end would not be favored by a pet causing premature wear of the favored end. With the invention, a chew toy for dogs is provided which permits periodic addition of flavor material without depending upon only an initial amount of impregnated flavoring material. With the invention, a chew toy for dogs is provided which has lights combined therewith and permits the pet, in playing with the toy, to move the light around.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved chew toy for cats and dogs, comprising:
   a rope knot node, and
   a first flexible rope arm, a second flexible rope arm, and a third flexible rope arm depending from said rope knot node,
   wherein each of said first, second and third flexible rope arms includes an end knot, a braided middle portion extending between said node and said end knot, and an unbraided open-stranded free end extending from said end knot.

2. The chew toy described in claim 1 wherein:
   said first flexible rope arm includes a first portion projecting from said rope knot node,
   said second flexible rope arm includes a second portion projecting from said rope knot node, and
   said third flexible rope arm includes a third portion projecting from said rope knot node.

3. The chew toy described in claim 2 wherein a first orientation angle between said first portion and said second portion is approximately sixty degrees.

4. The chew toy described in claim 2 wherein a second orientation angle between said second portion and said third portion is approximately sixty degrees.

5. The chew toy described in claim 2 wherein a third orientation angle between said first portion and said third portion is approximately one hundred twenty degrees.

6. The chew toy described in claim 1, further including:
   a receptacle assembly supported by and housed by said rope knot node,
   a light source assembly attached to said receptacle assembly for providing light to said chew toy.

7. The chew toy described in claim 6 wherein:
   said receptacle assembly is shaped in the form of a hemisphere which includes a planar, circular top side.

8. The chew toy described in claim 7 fix wherein:
   said top side of said receptacle assembly is transparent, and
   said first distributor tube, said second distributor tube, and said third distributor tube are transparent.

9. The chew toy descried in claim 7 wherein said light source assembly includes:
   a hemispherically shaped housing member connected to said hemispherically shaped receptacle assembly,
   a battery power source housed within said hemispherically shaped housing member,
   a lamp, connected to said battery power source, powered by energy from said battery power source, and
   a switch assembly, supported by said hemispherically shaped housing member and in circuit with said lamp and said battery power source, for controlling illumination of said lamp.

10. The chew toy described in claim 9 wherein said hemispherically shaped housing member is transparent.

11. A new and improved chew toy for cats and dogs, comprising:

a rope knot node, and a first flexible rope arm, a second flexible rope arm, and a third flexible rope arm depending from said rope knot node, further including:

a flavor distribution assembly supported by said rope knot node, said first flexible rope arm, said second flexible rope arm, and said third flexible rope arm.

12. The chew toy described in claim 11 wherein said flavor distribution assembly includes:

a receptacle assembly supported by and housed by said rope knot node, a first distributor tube connected to said receptacle assembly and supported by and housed by said first flexible rope arm, a second distributor tube connected to said receptacle assembly and supported by and housed by said second flexible rope arm, and a third distributor tube connected to said receptacle assembly and supported by and housed by said third flexible rope arm.

13. The chew toy described in claim 12 wherein said receptacle assembly includes a filler tube adapted to receive a hypodermic needle connected to a syringe.

14. The chew toy described in claim 12 wherein:

said first distributor tube, said second distributor tube, and said third distributor tube, respectively, include dispensing apertures through which flavor composition seeps from said respective distributor tubes from said receptacle assembly.

* * * * *